(12) United States Patent
Kim et al.

(10) Patent No.: US 11,699,792 B2
(45) Date of Patent: Jul. 11, 2023

(54) CONDUCTIVE MATERIAL, ELECTRODE COMPRISING THE CONDUCTIVE MATERIAL, SECONDARY BATTERY COMPRISING THE ELECTRODE, AND METHOD FOR PREPARING THE CONDUCTIVE MATERIAL

(71) Applicant: LG Chem, Ltd., Seoul (KR)

(72) Inventors: Tae Gon Kim, Daejeon (KR); Seul Ki Kim, Daejeon (KR); Wang Mo Jung, Daejeon (KR); Sang Wook Lee, Daejeon (KR)

(73) Assignee: LG Energy Solution, Ltd.

( * ) Notice: Subject to any disclaimer, the term of this patent is extended or adjusted under 35 U.S.C. 154(b) by 273 days.

(21) Appl. No.: 16/958,990

(22) PCT Filed: Feb. 1, 2019

(86) PCT No.: PCT/KR2019/001482
§ 371 (c)(1),
(2) Date: Jun. 29, 2020

(87) PCT Pub. No.: WO2019/156462
PCT Pub. Date: Aug. 15, 2019

(65) Prior Publication Data
US 2020/0335794 A1    Oct. 22, 2020

(30) Foreign Application Priority Data
Feb. 7, 2018 (KR) .................. 10-2018-0015292

(51) Int. Cl.
*H01M 4/62* (2006.01)
*C01B 32/184* (2017.01)
(Continued)

(52) U.S. Cl.
CPC ........... *H01M 4/625* (2013.01); *C01B 32/184* (2017.08); *H01B 1/04* (2013.01);
(Continued)

(58) Field of Classification Search
CPC . C01B 32/184; C01B 32/182; C01B 2204/04; C01B 2204/22; C01B 2204/30;
(Continued)

(56) References Cited

U.S. PATENT DOCUMENTS

| 4,279,880 A | 7/1981 | Giet |
| 2011/0159372 A1 | 6/2011 | Zhamu et al. |

(Continued)

FOREIGN PATENT DOCUMENTS

| CN | 104781954 A | 7/2015 |
| CN | 104812566 A | 7/2015 |

(Continued)

OTHER PUBLICATIONS

Kumar "Self-Assembled and One-Step Synthesis of Interconnected 3D Network of Fe3O4/Reduced Graphene Oxide Nanosheets Hybrid for High-Performance Supercapacitor Electrode." ACS Appl. Mater. Interfaces 2017, 9, 8880-8890 (Year: 2017).*

(Continued)

*Primary Examiner* — Tri V Nguyen
(74) *Attorney, Agent, or Firm* — Lerner David LLP

(57) ABSTRACT

A conductive material, and a method for preparing the same are provided. The conductive material has a structure where a plurality of graphene sheets are interconnected, wherein an oxygen content is 1 wt % or higher based on the total weight of the conductive material, and a D/G peak ratio is 2.0 or less when the Raman spectrum is measured.

12 Claims, 3 Drawing Sheets

(51) Int. Cl.
*H01B 1/04* (2006.01)
*H01M 10/0525* (2010.01)

(52) U.S. Cl.
CPC ..... *H01M 10/0525* (2013.01); *C01B 2204/04* (2013.01); *C01B 2204/22* (2013.01); *C01B 2204/30* (2013.01); *C01B 2204/32* (2013.01); *C01P 2002/82* (2013.01); *C01P 2004/03* (2013.01); *C01P 2004/04* (2013.01)

(58) Field of Classification Search
CPC .............. C01B 2204/32; H01M 4/625; H01M 10/0525; H01M 10/052; H01M 13/0016; H01B 1/04; H01B 5/00
USPC .................................. 429/232; 252/500, 502
See application file for complete search history.

(56) References Cited

U.S. PATENT DOCUMENTS

| | | |
|---|---|---|
| 2012/0282446 A1 | 11/2012 | Jo et al. |
| 2014/0127567 A1 | 5/2014 | Kuriki et al. |
| 2014/0147648 A1 | 5/2014 | Zhamu et al. |
| 2016/0298244 A1 | 10/2016 | Abdelkader et al. |
| 2017/0073834 A1 | 3/2017 | Zhamu et al. |
| 2017/0133680 A1 | 5/2017 | Cheng et al. |
| 2017/0162291 A1 | 6/2017 | Zhamu et al. |
| 2018/0250704 A1 | 9/2018 | Truica-Marasescu et al. |
| 2018/0269467 A1 | 9/2018 | Sonoda et al. |

FOREIGN PATENT DOCUMENTS

| | | | |
|---|---|---|---|
| CN | 105899457 A | | 8/2016 |
| EP | 3136481 A1 | | 3/2017 |
| GB | 2520496 A | | 5/2015 |
| JP | 2007137980 A | | 6/2007 |
| JP | 2009035598 A | | 2/2009 |
| JP | 2014169193 A | | 9/2014 |
| JP | 2016210628 A | | 12/2016 |
| JP | 2017033758 A | | 2/2017 |
| KR | 20120114317 A | | 10/2012 |
| KR | 20140039372 A | * | 2/2014 .............. G01D 5/16 |
| KR | 20150089028 A | | 8/2015 |
| KR | 20170088410 A | | 8/2017 |
| KR | 101937900 B1 | | 1/2019 |
| WO | 2017041171 A1 | | 3/2017 |

OTHER PUBLICATIONS

Lee Hierarchical networks of redox-active reduced crumpled graphene oxide and functionalized few-walled carbon nanotubes for rapid electrochemical energy storage. Nanoscale, 2016, 8, 12330-12338 (Year: 2016).*

Chinese Search Report for Application No. 201980006952.5, dated Jul. 5, 2021, 3 pages.

Extended European Search Report including Written Opinion for EP19750782.5 dated Dec. 1, 2020; 10 pages.

International Search Report for Application No. PCT/KR2019/001482, dated May 10, 2019, pp. 1-3.

* cited by examiner (a)

(b)

CONDUCTIVE MATERIAL, ELECTRODE COMPRISING THE CONDUCTIVE MATERIAL, SECONDARY BATTERY COMPRISING THE ELECTRODE, AND METHOD FOR PREPARING THE CONDUCTIVE MATERIAL

CROSS-REFERENCE TO RELATED APPLICATIONS

This application is a national phase entry under 35 U.S.C. § 371 of International Application No. PCT/KR2019/001482, filed Feb. 1, 2019, which claims the benefit of Korean Patent Application No. 10-2018-0015292, filed Feb. 7, 2018, the disclosures of which are incorporated herein by reference.

TECHNICAL FIELD

The present invention relates to a conductive material, which includes a structure where a plurality of graphene sheets are interconnected, in which the oxygen content is 1 wt % or higher based on the total weight of the conductive material, and the D/G peak ratio is 2.0 or less when the Raman spectrum is measured; an electrode including the conductive material; a secondary battery including the electrode; and a method for preparing the conductive material.

BACKGROUND ART

In recent years, there has been a dramatic increase in demand for batteries as energy sources with the technical development and increase in demand for mobile devices, and accordingly, various studies on batteries that can meet various demands are underway. In particular, secondary batteries which have excellent lifetime and characteristics while having a high energy density as a power source of such devices are being actively studied.

A lithium secondary battery refers to a battery in which a non-aqueous electro containing lithium ions is included in an electrode assembly that includes a positive electrode including a positive electrode active material enabling intercalation/dentercalation of lithium ions, a negative electrode including a negative electrode active material enabling intercalation/deintercalation of: lithium ions, and microporous separator interposed between the positive electrode and the negative electrode.

The positive electrode and/or the negative electrode, for improving conductivity, may include a conductive material. Conventionally, a dot-type conductive material (e.g., carbon black) was mainly used and a linear conductive material (e.g., carbon nanotube, carbon nanofiber, etc.) is also used to further improve conductivity.

However, although the linear conductive material has excellent electrical conductivity, the dispersion in the electrode-forming slurry is not easily achieved due to the nature of the material that grows to a bundle type and/or entangled type, and accordingly, there arises a problem in that the resistance in the electrode becomes non-uniform. To solve the dispersibility problem, a functional group may be introduced into a linear conductive material. However, the introduction may cause a side reaction on the surface of a conductive material, thus making it difficult to realize mass production and application.

Meanwhile, graphene may be used as a planar conductive material. Graphene has an advantage in that it has an excellent electrical conductivity. However, although it is advantageous to form graphene as a single layer for improving conductivity, the process of preparing a single layer type is very difficult thus increasing the production cost. On the contrary, when the graphene has a thickness greater than an appropriate level, there is a problem in that the improvement of electrical conductivity is insufficient. Additionally, even when the graphene having a thickness of 10 nm or less itself, being lower than an appropriate level, there is a problem in that the excessive surface contact of the graphene prevents the movement to the electrolyte in the electrode, resulting in deterioration of the battery performance (e.g., an increase in electrode resistance).

Accordingly, there is a demand for a conductive material which can be rather easily prepared compared to the conventional method, and can improve the capacity of a battery due to excellent electrical conductivity.

DISCLOSURE OF THE INVENTION

Technical Problem

An aspect of the present invention provides a novel conductive material which can be rather easily prepared compared to the conventional method, and can improve the capacity of a battery due to excellent electrical conductivity; an electrode including the conductive material; a secondary battery including the electrode; and a method for preparing the conductive material.

Technical Solution

According to an exemplary embodiment of the present invention, there is provided a conductive material, which includes a structure where a plurality of graphene sheets are interconnected, in which the oxygen content is 1 wt % or higher based on the total weight of the conductive material, and the D/G peak ratio is 2.0 or less when the Raman spectrum is measured.

According to another exemplary embodiment of the present invention, there is provided a method for preparing a conductive material, which includes: a step of preparing a preliminary conductive material; and a step of transforming the preliminary conductive material by oxidation treatment, in which the step of transforming a preliminary conductive material by oxidation treatment comprises at least one of the followings: a) subjecting the preliminary conductive material to a first heat treatment in an oxygen atmosphere or air atmosphere at a temperature of 200° C. to 800° C.; and b) reacting the preliminary conductive material with acidic vapor at 120° C. to 300° C.

According to still another exemplary embodiment of the present invention, there is provided an electrode including the conductive material.

According to still another exemplary embodiment of the present invention, there is provided a secondary battery including the electrode.

Advantageous Effects

According to the present invention, a novel conductive material having a structure in which a plurality of graphene sheets are interconnected can be readily dispersed within an electrode slurry due to the high oxygen content. In addition, since the structural stress can be solved during the course of preparing the conductive material, the conductive material can have a high graphitization degree thus having a low powder resistance and improved battery capacity. Additionally, the process of preparing the conductive material can be simplified.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1:
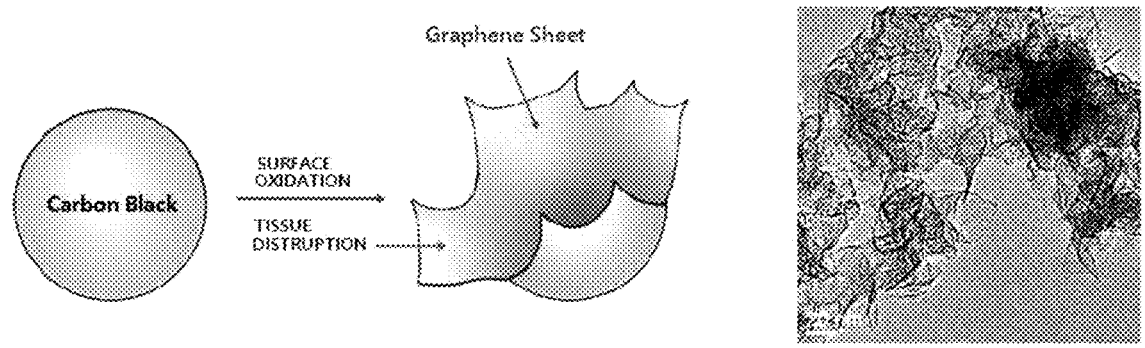
FIG. 1 shows a schematic diagram and a TEM image illustrating a process of forming a graphene sheet included in a conductive material of the present invention.

Hereinafter, the present invention will be described in more detail to allow for a clearer understanding of the present invention. It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

<Novel Conductive Material>

The conductive material according to an exemplary embodiment of the present invention may include a structure where a plurality of graphene sheets are interconnected, in which the oxygen content may be 1 wt % or higher based on the total weight of the conductive material, and the D/G peak ratio may be 2.0 or less when the Raman spectrum is measured.

As used herein, graphene sheet refers to a carbonaceous structure which has a thickness of 20 nm or less, flexibility, and is in a form of a thin film.

The conductive material may have a structure in which a plurality of graphene sheets are interconnected. Specifically, the conductive material may be such that at least two graphene sheets are directly or indirectly connected to each other.

The conductive material may be in the form of a secondary particle formed by connecting a plurality of graphene sheets. Specifically, the plurality of graphene sheets may be connected to each other so as to form secondary particles in the form of a long chain, and more specifically, the secondary particles in the form of a long chain may include a region in which the plurality of graphene sheets are partially aggregated. Since the secondary particles have a unique chain-like connecting structure, the conductive material has excellent electrical conductivity and thermal conductivity.

The conductive material may further include a connecting part connected to at least some of the graphene sheets of the plurality of graphene sheets. In the present invention, when the conductive material is prepared, a preliminary conductive material (e.g., carbon black) may be ruptured by continuous oxidation to form graphene sheets, and there may also be a part in which the original shape is maintained without being ruptured. In particular, the part in which the original shape is maintained may be a part corresponding to the connecting part. Therefore, the connecting part may be in a non-graphene shape, and the non-graphene shape may refer to a lump shape with a thickness greater than that of a graphene sheet, unlike the graphene sheets described above.

A part of each of the plurality of graphene sheets may be directly connected to each other. Or otherwise, at least some of the plurality of graphene sheets may be connected to each other through the connecting part, and specifically, at least some of each of the plurality of graphene sheets may be connected to the connecting part. The conductive material of the present invention may include both connecting methods.

The conductive material may be one in which the shape of carbon black that has a particle shape close to a sphere (e.g., acetylene black, furnace black, thermal black, channel black, and lamp black) is transformed by oxidation treatment. Referring to the schematic diagram of FIG. 1, the tissue structure of carbon black may be modified by oxidation treatment to form particles including a plurality of graphene sheets. When the carbon black is in the form of a secondary particle, a conductive material in the form of a secondary particle in which particles including the plurality of graphene sheets are aggregated may be formed.

The average thickness of the graphene sheet may be 10 nm or less, specifically in a range of 0.34 nm to 10 nm, and more specifically, in a range of 0.34 nm to 5 nm. When the above range is satisfied, the unique flexibility of the graphene sheet can be expressed, and the surface contact by the graphene sheet can be improved, and thus the conductive material can have excellent electrical conductivity. The graphene sheet may be in the form of a stacked layer of up to 10 graphene layers.

The graphene sheet may have a lateral size of 200 nm or less, specifically 150 nm or less, and more specifically 10-100 nm, for example 50-90 nm. The lateral size of the graphene sheet may be controlled according to the degree of heat treatment. For example, the lateral size of the graphene sheet may be controlled by performing additional heat treatment in an inert atmosphere after oxidation treatment. When the above range is satisfied, the ions in the electrolyte can be diffused smoothly in the electrode. Accordingly, the rapid charging characteristic of a battery can be improved, and the rate characteristic can also be improved. The lateral size of the graphene sheet refers to the mean of the 100 lateral sizes of the graphene sheets observed by SEM or TEM. In particular, the lateral size refers to the longest length of a line when the line was assumed from one point to another point within a graphene sheet.

The oxygen content of the conductive material may be 1 wt % or more based on the total weight of the conductive material, and specifically in a range of 1-10 wt %. When the above range is satisfied, a conductive material can be smoothly dispersed within an electrode slurry that is formed during the preparation of an electrode, and thus, the conductivity of the electrode can be improved, and the capacity of the prepared battery can be improved. The oxygen content may be measured by the method of elemental analysis of C, H, O, and N.

The oxygen content may be achieved during the process of performing oxidation treatment of carbon black.

Specifically, an oxygen-containing functional group may be formed on the surface of a conductive material by oxidation treatment. The oxygen-containing functional group may be at least one selected from the group consisting of a carboxyl group, a hydroxy group, and a carbonyl group. After the oxidation treatment process, the oxygen content may be additionally controlled via heat treatment of a conductive material in an inert atmosphere.

The conductive material may have a higher degree of graphitization than carbon black before oxidation treatment. Specifically, the high structural stress caused by the surface tension of the carbon black is partially removed by formation of graphene sheets, and the graphitization degree of the prepared conductive material may increase.

The conductive material is characterized in that the D/G peak ratio may be 2.0 or less when the Raman spectrum is measured, specifically in a range of 0.9 to 2.0, and more specifically 1.1 to 1.8. In the Raman spectrum, the G peak in the vicinity of 1,590 cm$^{-1}$ is resulted from the $E_{2g}$ vibration mode of the sp$^2$ binding of carbon, and the D peak in the vicinity of 1350 cm$^{-1}$ appears when there is a defect in the sp$^2$ binding. That is, in a case where the D/G peak ratio is satisfied, it means that a high graphitization degree can be obtained, and accordingly, when the conductive material is used, the battery capacity and electrical characteristics may be improved by the high electrical conductivity of the conductive material.

With regard to the conductive material, the value calculated by Equation 1 below may be 0.2 or less, specifically 0 to 0.15, and more specifically, 0 to 0.1.

$$\frac{|b-a|}{a} \quad \text{[Equation 1]}$$

In Equation 1 above, 'a' represents a specific surface area (m$^2$/g) of the conductive material measured by the nitrogen adsorption BET method, and 'b' represents an iodine adsorption value (mg/g) of the conductive material.

When the conductive material includes a pore structure inside or between particles, a plurality of small-sized nitrogen (N$_2$) molecules can be adsorbed within the pores. In contrast, it is difficult for iodine (I$_2$), which is a relatively large molecule, to enter the pores compared to the nitrogen molecules and thus the iodine adsorption value shown is not large. That is, when the pore structure is present, the value according to Equation 1 becomes large. In other words, in the conductive material of the present invention, when the value according to Equation 1 is 0.2 or less, it means that the conductive material does not include micropores. That is, when pores are not present, the degree of adsorption of iodine and the degree of adsorption of nitrogen are similar to each other, and thus, the value of the Equation 1 becomes smaller. This means that the surface of the conductive material is a free surface. Specifically, graphene sheets are formed as most carbon blacks are transformed into a hollow structure by oxidation treatment and the structure is continuously destroyed by oxidation treatment. In particular, the graphene sheets may be formed in such a shape where the graphene sheets open outward without forming a pore structure.

With regard to the conductive material, the specific surface area (m$^2$/g) of the conductive material measured by the nitrogen adsorption BET method may be 200 m$^2$/g or higher, specifically in a range of 300 m$^2$/g to 1,100 m$^2$/g, and more specifically in a range of 500 m$^2$/g to 900 m$^2$/g. When the above range of specific surface area is satisfied, it means that the area of the graphene sheet in the conductive material is large, and accordingly, even if the amount of a conductive material in the electrode is small, the conductivity of the electrode can be secured.

<Electrode>

An electrode according to another exemplary embodiment of the present invention may include a conductive material of the exemplary embodiment described above. The electrode may be a positive electrode or a negative electrode.

The electrode may include a current collector or an active material layer disposed on the current collector.

The positive electrode may include a current collector and a positive electrode active material layer, which is disposed on the current collector and includes a positive electrode active material. The negative electrode may include a current collector and a negative electrode active material layer, which is disposed on the current collector and includes a negative electrode active material. Furthermore, each of the positive electrode active material layer and the negative electrode active material layer may include a binder.

The current collector is not particularly limited as long as the current collector has electrical conductivity without inducing a chemical change in the subject battery.

For example, as the current collector, those in which the surface of copper, stainless steel, aluminum, nickel, titanium, sintered carbon, or aluminum or stainless steel was treated with carbon, nickel, titanium, silver, etc. may be used. Specifically, transition metals that adsorb carbon well (e.g., copper and nickel) may be used as a current collector. The positive electrode active material layer or a negative electrode active material layer may be disposed on one or both sides of the current collector, respectively.

The positive electrode active material may be a positive electrode active material which is commonly used. Specifically, examples of the positive electrode active material may include layered compounds (e.g., lithium cobalt oxide (LiCoO$_2$), lithium nickel oxide (LiNiO$_2$), etc.) or compounds substituted with one or more transition metals; lithium manganese oxides with the formulas of Li$_{1+y1}$Mn$_{2-y1}$O$_4$ (0≤y≤10.33), LiMnO$_3$, LiMn$_2$O$_3$, LiMnO$_2$, etc.; lithium copper oxides (Li$_2$CuO$_2$); vanadium oxides (e.g., LiV$_3$O$_8$, V$_2$O$_5$, Cu$_2$V$_2$O$_7$, etc.); Ni-site type lithium nickel oxides represented by the formula of LiNi$_{1-y2}$M1$_{y2}$O$_2$ (where M1 is Co, Mn, Al, Cu, Fe, Mg, B, or Ga, with the proviso of 0.01≤y≤20.3); lithium manganese composite oxides represented by the formula of LiMn$_{2-y3}$M2$_{y3}$O$_2$ (where M2 is Co, Ni, Fe, Cr, Zn, or Ta, with the proviso of 0.01≤y≤30.1) or Li$_2$Mn$_3$M3O$_8$ (where M3 is Fe, Co, Ni, Cu, or Zn); LiMn$_2$O$_4$ in which part of Li in the formula is substituted with an alkaline earth metal ion, but the positive electrode active material is not limited thereto.

The negative electrode active material may be a graphite-based active material particle or a silicon-based active material particle. As the graphite-based active material particle, at least one kind selected from the group consisting of artificial graphite, natural graphite, graphitized carbon fiber, and graphitized mesocarbon microbeads may be used. In particular, when artificial graphite is used, rate characteristic can be improved. As the silicon-based active material particle, at least one kind selected from the group consisting of Si, SiO$_x$ (0<x<2), Si-C composite and Si-Y alloys (where Y is an element selected from the group consisting of an alkali metal, an alkaline earth metal, a transition metal, a Group 13 element, a Group 14 element, a rare earth element, and a combination thereof) may be used. In particular, when Si is used, high capacity of a battery can be derived.

As the binder, at least one kind selected from the group consisting of a polyvinylidene fluoride-hexafluoropropylene copolymer (PVDF-co-HFP), polyvinylidenefluoride, polyacrylonitrile, polymethylmethacrylate, polyvinyl alcohol, carboxymethylcellulose (CMC), starch, hydroxypropyl cellulose, regenerated cellulose, polyvinylpyrrolidone, tetrafluoroethylene, polyethylene, polypropylene, polyacrylic acid, an ethylene-propylene-diene monomer (EPDM), sulfonated EPDM, styrene butadiene rubber (SBR), fluorine rubber, polyacrylic acid, and materials in which the hydrogen is substituted with Li, Na, Ca, etc. may be included, and in addition, various copolymers thereof may be included.

<Secondary Battery>

The secondary battery according to another exemplary embodiment of the present invention may include a negative electrode, a positive electrode, separator interposed between. the positive electrode and the negative electrode, and an electrolyte, and at least one of the positive electrode and the negative electrode may be an electrode of other exemplary embodiments described above.

As the separator, any separator which is conventionally used in secondary batteries may be used without particular limitation, as long as the separator can separate a negative electrode and a positive electrode and provides a movement passage for lithium ions, and in particular, it is desirable that the separator has low resistance against the movement of ions of the electrolyte and has excellent electrolyte humidification ability. Specifically, a porous polymer film, for example, porous polymer film prepared by a polyolefin-based polymer (e.g., an ethylene homopolymer, a propylene homopolymer, an ethylene/butene copolymer, an ethylene/hexene copolymer, and an ethylene/methacrylate copolymer) or a layered structure of two or more layers may be used. Additionally, nonwoven fabrics made of conventional porous nonwoven fabrics (e.g., glass fibers with a high melting point, polyethylene terephthalate fibers, etc.) may be used. Additionally, a separator on which a material containing a ceramic component or polymer material is coated may be used to ensure heat resistance or mechanical strength, and optionally, the separator with a single layer or multi-layer structure may be used.

Examples of the electrolyte may include an organic-based electrolyte, inorganic-based electrolyte, solid polymer electrolyte, gel-type polymer electrolyte, solid inorganic electrolyte, molten-type inorganic electrolyte, etc. which can be used for the preparation of secondary batteries, but the electrolyte is not limited thereto.

Specifically, the electrolyte may include a non-aqueous organic solvent and a metal salt.

As the non-aqueous organic solvent, for example, aprotic organic solvents (e.g., N-methyl-2-pyrrolidinone, propylene carbonate, ethylene carbonate, butylene carbonate, dimethyl carbonate, diethyl carbonate, gamma-butylolactone, 1,2-dimethoxyethane, tetrahydrofuranc, tetrahydrofuran, 2-methyltetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxymethane, dioxolane derivatives, sulfolane, methylsulfolane, 1,3-dimethyl-2-imidazolidinone, propylene carbonate derivatives, tetrahydrofuran derivatives, ether, methyl propionate, ethyl propionate, etc.) may be used.

In particular, ethylene carbonate and propylene carbonate, which are the cyclic carbonates among the carbonate-based organic solvents, are organic solvents with high viscosity, and these solvents may be desirably used because they can dissociate the lithium salt well due to high permittivity. When such a cyclic carbonate is mixed with a linear carbonate (e.g., dimethyl carbonate and diethyl carbonate) which has a low viscosity, low permittivity in an appropriate ratio, it is possible to prepare an electrolyte having high electric conductivity, and thus can be used more desirably.

As the metal salt, a lithium salt may be used. The lithium salt is a material which can be readily dissolved in the non-aqueous electrolytic solution. As the anions of the lithium salt, at least one kind selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CFR_3SO_2)_2N^-$, $(FSO_2)_2N^-$, $CF_3CF_2(CF_3)_2CO^-$, $(CF_3SO_{22}CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2CO_2)_2N^-$ may be used.

For the purpose of improving the lifetime characteristics of the battery, inhibiting the reduction of battery capacity, improving discharge capacity of batteries, etc., the electrolyte may further include, the electrolyte components, at least one kind of additive (e.g., a haloalkylene carbonate-based compound (e.g., difluoroethylene carbonate), pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salt, pyrrole, 2-methoxyethanol, aluminum trichloride, etc.).

According to another exemplary embodiment of the present invention, there is provided a battery module including the secondary battery as a unit cell, and a battery pack including the battery module. The battery module and the battery pack include the secondary battery having high capacity, a high rate characteristic, and a high cycle characteristic, and thus, the battery module and the battery pack can be used as a power source for medium/large-sized devices selected from the group consisting of electric vehicles, hybrid electric vehicles, plug-in hybrid electric vehicles, and electric power storage systems.

<Method for Preparation of Conductive Material>

The method for preparing a conductive material according to still another exemplary embodiment of the present invention, includes: a method for preparing a conductive material, which includes: a step of preparing a preliminary conductive material; and a step of transforming the preliminary conductive material by oxidation treatment, in which the step of transforming a preliminary conductive material by oxidation treatment includes at least one of a) subjecting the preliminary conductive material to heat treatment in an oxygen atmosphere or air atmosphere at a temperature of 200° C. to 800° C.; and b) reacting the preliminary conductive material with acidic vapor at 120° C. to 300° C.

In the step of preparing the preliminary conductive material, the preliminary conductive material may be carbon black. Specifically, the preliminary conductive material may be at least one selected from the group consisting of acetylene black, furnace black, thermal black, channel black, and lamp black. More specifically, the preliminary conductive material may be acetylene black which is prepared at the highest temperature and thus basically has an excellent graphitization degree.

The step of preparing the preliminary conductive material may include pyrolysis of the acetylene gas, and carbon black, and specifically acetylene black may be formed via pyrolysis. The acetylene gas may be an acetylene gas of high purity, specifically a purity of 95% or higher, and more specifically, a purity of 98% or higher.

The pyrolysis may be thermal decomposition of the acetylene gas at a temperature of 1,500° C. or higher, specifically 1,500° C. to 2,200° C., and more specifically 1,500° C. to 2,000° C. When the above range is satisfied, the graphitization degree of the prepared preliminary conductive material may be high, and thus the graphitization degree of a conductive material being prepared may also be high. Accordingly, the electrical conductivity of the conductive material may be improved.

The preliminary conductive material may be carbon black, but it is preferred that the preliminary conductive material be acetylene black for the following reasons. The graphene sheet, which is included in the conductive material of the present invention, may be formed by transformation of the surface of a preliminary conductive material by oxidation treatment. The acetylene black formed by the pyrolysis has a high graphitization degree on the surface. Accordingly, the structure of a graphene sheet may be smoothly formed when the acetylene black is subjected to oxidation treatment, compared to when other carbon black essentially containing an oxygen functional group in part on the surface is subjected to oxidation treatment.

The pyrolysis may be performed by adjusting the internal temperature of a reactor to the above temperature range, injecting acetylene gas into the reactor, and then performing pyrolysis instantaneously. Additionally, during this process, air, oxygen, and $H_2O$ may be further added so as to control the density of the conductive material, oxygen functional group, etc., and the connecting structure within the conductive material may be controlled.

The step of transforming the preliminary conductive material by oxidation treatment may include at least one of the followings: (a) subjecting the preliminary conductive material to a first heat treatment in an oxygen atmosphere or air atmosphere at a temperature of 200° C. to 800° C. (step (a)); and (b) reacting the preliminary conductive material with acidic vapor at 120° C. to 300° C. (step (b)).

In step (a), the oxygen atmosphere or air atmosphere may be formed by injecting oxygen or air into a reactor in which the preliminary conductive material is received. Specifically, the structure of the graphene sheet may be formed according to the oxidation process in the reactor according to the setting of the appropriate amount of oxygen or air being introduced and a rate thereof, reaction temperature, and reaction time during the first heat treatment. Additionally, the conditions for the oxidation process may vary due to the differences in the density of the preliminary conductive material, the amount of oxygen functional group, etc.

In step (a), the first heat treatment may be performed by controlling the temperature of the reactor, in which the preliminary conductive material is received. The first heat treatment may be performed at a temperature of 200° C. to 800°, and specifically, at a temperature of 200° C. to 450° C. When the above temperature is satisfied, it is possible to prevent the extremely rapid oxidation of the preliminary conductive material, and a graphene sheet of a desirable size can be formed. The first heat treatment may be performed for 1-50 hours.

In step (b), the preliminary conductive material may be oxidized by reacting with acid vapor and thereby graphene may be formed. Specifically, the acid vapor may be a vapor derived from an acid solution, such as HCl, $HNO_3$, etc. The temperature of the acid vapor reacting with the preliminary conductive material may be in a range of 120° C. to 300° C.

After the step of transforming the preliminary conductive material by oxidation treatment, a second heat treatment process may be additionally performed in an inert atmosphere so as to increase the size of the formed graphene sheet. Specifically, the method for preparing the conductive material may further include, after the step of transforming the preliminary conductive material by oxidation treatment, a step of subjecting the transformed preliminary conductive material to a second heat treatment at a temperature of 500° C. or higher. In particular, the inert atmosphere may be formed in vacuum or in an atmosphere of any one gas selected from the group consisting of helium, argon, and nitrogen. The second heat treatment temperature may be 500° C. or higher, specifically in a range of 500° C. to 2800° C., and more specifically in a range of 600° C. to 1600° C.

The mechanism in which the conductive material described in the present invention is formed by the method for preparing the conductive material may be as follows.

During the preparation of the conductive material, oxidation treatment is performed with regard to spherical or chain-type carbon black (specifically acetylene black) under particular conditions where the average size of the spherical primary particles is 50 nm or less and the primary particles commonly share the tissues. In this case, penetration and oxidation reaction of an oxidizing agent (e.g., oxygen, acid vapor, etc.) occur starting from defected parts (e.g., grain boundary, dislocation, etc. existing in the micro unit structure of the carbon black). When oxidation treatment is performed for a certain period of time in the temperature range described in the production method, the oxidizing agent penetrates even into the microstructure of the carbon black and thereby oxidation proceeds. In particular, to solve the structural stress of the microstructure inside the primary particles having the radius of curvature larger than the radius of curvature of the spherical primary particle surface, the oxidation reaction occurs rapidly inside. Accordingly, the internal carbons are oxidized by gases such as CO, $CO_2$, $CH_4$, etc., and the primary particles are transformed into a hollow type. As the surface structure of the hollow primary particles is destroyed by the continuous oxidation treatment, most structural stresses remaining in the spherical primary particles can be solved, and graphene sheets will appear during this process. Accordingly, the transformation process can be accelerated as the average size of the primary particles (i.e., carbon black) becomes smaller, as the internal density of the particles becomes smaller, and as the content of the oxygen functional group becomes higher. Additionally, step (a) rather than step (b) is more preferred in that step (a) can further accelerate the transformation process.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

EXAMPLE 1

Preparation of Conductive Material (1) Formation of Preliminary Conductive Material (Acetylene Black)

Acetylene gas with a purity of 98% was instantaneously sprayed on a reactor having an internal temperature of 2,000° C. and pyrolyzed to form acetylene black.

(2) Preparation of Conductive Material

Figure 2:
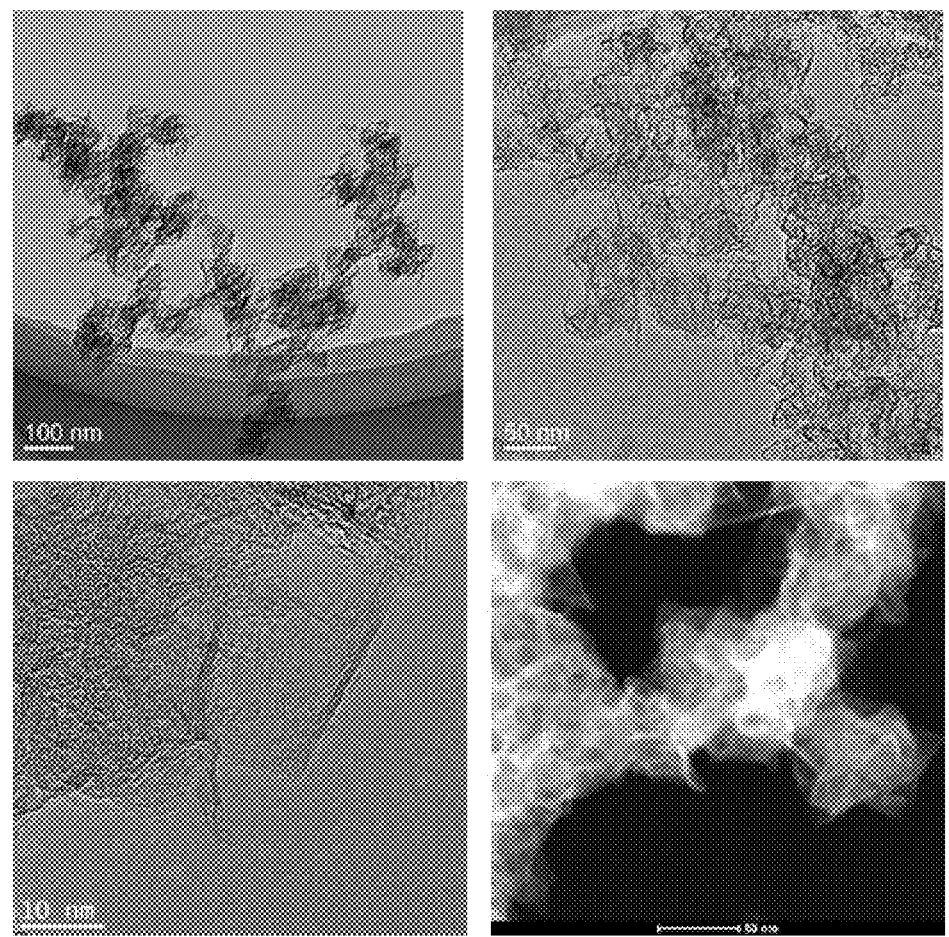
FIG. 2 shows TEM and scanning TEM (STEM) images of the conductive material of Example 1 of the present invention.
Figure 3:
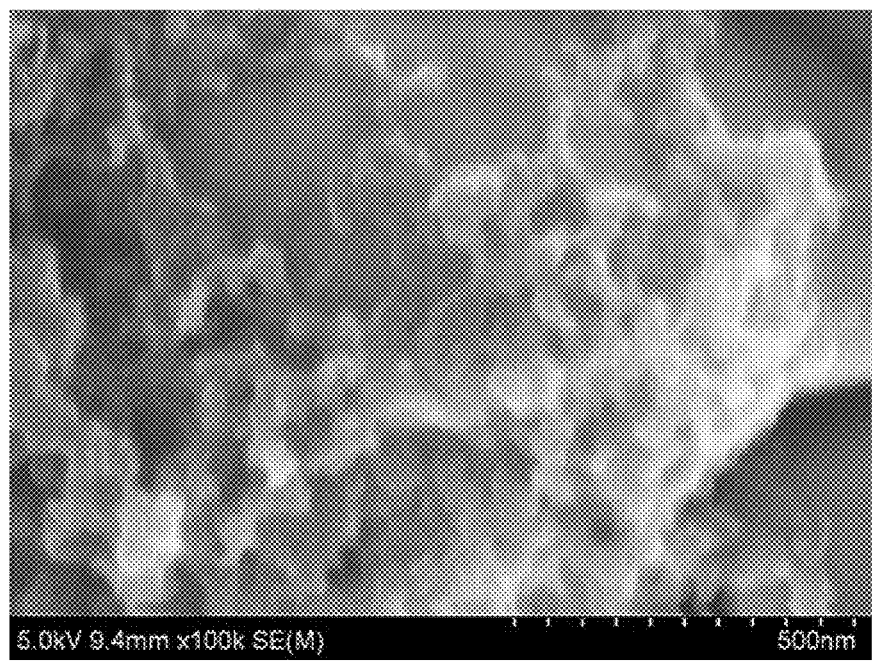
FIG. 3 shows an SEM image of the conductive material of Example 1 of the present invention.

Subsequently, the internal temperature of the reactor containing the acetylene black was set to 250° C., followed by oxidation treatment for 30 hours while introducing oxygen thereinto. As a result, a conductive material having a secondary particle structure, in which a plurality of graphene sheets having a lateral size of 40 nm are interconnected, was obtained (see FIGS. 2 and 3).

Example 2: Preparation of conductive material

Figure 4:
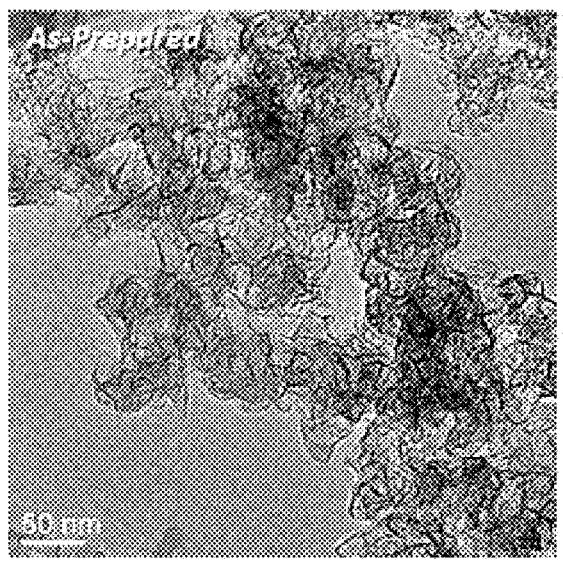
FIG. 4(a) shows a TEM image of the conductive material according to Example 1 of the present invention.
FIG. 4(b) shows a TEM image of the conductive material according to Example 2 of the present invention.
Figure 4:
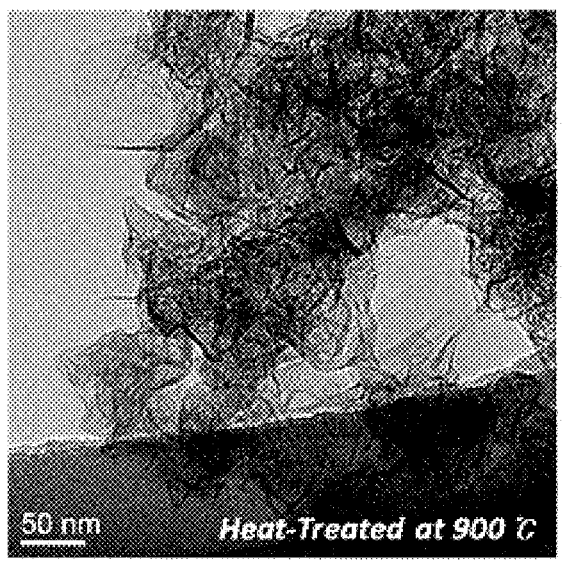

For the conductive material obtained in Example 1, further heat treatment was performed in an inert atmosphere at 900° C. for 1 hour, and a conductive material having a secondary particle structure, in which a plurality of graphene sheets having a lateral size of 65 nm are interconnected, was obtained. Referring to FIG. 4, it was confirmed that the conductive material of Example 1 illustrated in FIG. 4(*a*) was transformed into the conductive material of Example 2 illustrated in FIG. 4(*b*). Specifically, it was confirmed that the graphene sheets adjacent to each other by the heat treatment were interconnected and the lateral size was increased.

COMPARATIVE EXAMPLE 1

Preparation of Conventional Conductive Material (Carbon Black)

A carbon black (acetylene black) in the form of a secondary particle having aggregated primary particles was prepared. The average particle size of the prepared carbon black primary particles was 12 nm (Denka Co., Ltd., Small Acetylene Black (SAB)).

COMPARATIVE EXAMPLE 2

Preparation of Conventional Conductive Material (Carbon Black)

Figure 5:
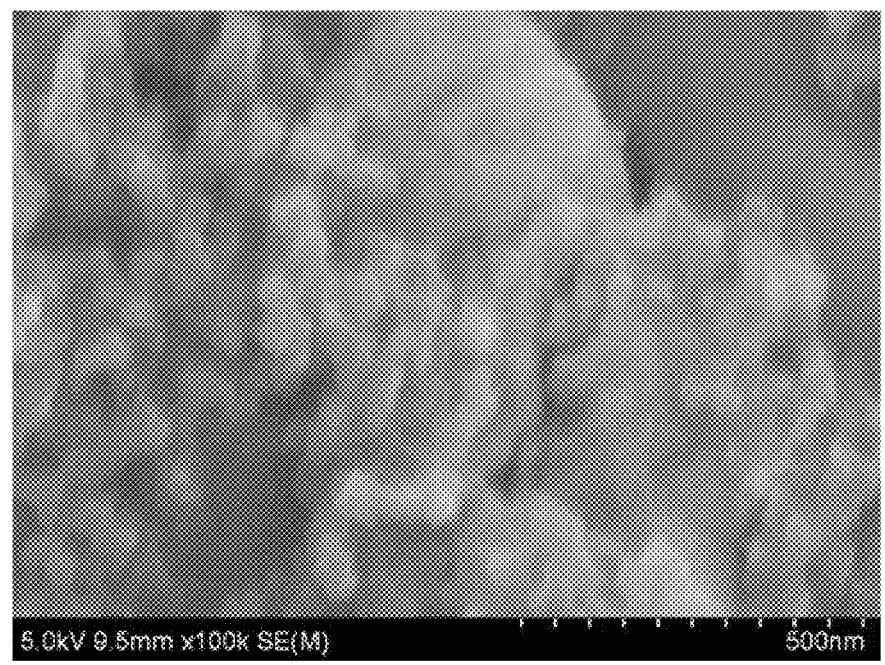
FIG. 5 shows an SEM image of the carbon black of Comparative Example 2 of the present invention.

A carbon black in the form of a secondary particle having aggregated primary particles was prepared. The average particle size of the prepared carbon black primary particles was 23 nm (Denka Co., Ltd., Normal Acetylene Black (NAB)) (see FIG. 5).

COMPARATIVE EXAMPLE 3

Preparation of Conventional Conductive Material (Carbon Black)

A carbon black in the form of a secondary particle having aggregated primary particles was prepared. The average particle size of the prepared carbon black primary particles was 45 nm (Denka Co., Ltd., Large Acetylene Black (LAB)).

Hereinafter, the physical properties of conductive materials of Examples 1 and 2 and those of Comparative Examples 1 to 3 were measured and evaluated. The results are shown in Table 1 below. Specifically, the physical properties were evaluated as follows.

1) Lateral size of the graphene sheet (nm): the size of 100 graphene sheets in a conductive material was measured by TEM (JEOL, JEM-2010F) and evaluated based on the average value.

2) Specific surface area ($m^2/g$) of nitrogen adsorption: Specific surface area was measured by degassing at 200° C. for 8 hours using the BET measurement device (BEL-SORP-MAX, Nippon Bell), followed by $N_2$ absorption/desorption at 77K.

3) Iodine adsorption value (mg/g): measured by the ASTM D1510.

4) Oxygen content (wt %): the amounts of C, H, and N elements were measured using the element analysis device (CHN-coder MT-5, Yanako), and the oxygen content (Oxygen) (differential) was calculated by reflecting the amount of residual ash.

5) Raman spectrum D/G ratio: measured by analyzing the Raman spectrum by the Ar-ion laser with a wavelength of 514.5 nm using the Raman spectrum analysis device (NRS-2000B, Jasco).

TABLE 1

|  | Lateral size of graphene sheet or average size of carbon black primary particle (nm) | Nitrogen Adsorption Specific Surface Area ($m^2/g$) | Iodine Adsorption Value (mg/g) | Oxygen Content (wt %) | Raman Spectrum D/G ratio |
|---|---|---|---|---|---|
| Example 1 | 41 (Graphene sheet) | 825 | 849 | 8.9 | 1.42 |
| Example 2 | 65 (Graphene sheet) | 712 | 736 | 3.2 | 1.27 |
| Comparative Example 1 | 12 (Carbon black primary particle) | 376 | 456 | 4.7 | 1.68 |
| Comparative Example 2 | 23 (Carbon black primary particle) | 135 | 152 | 0.3 | 1.23 |
| Comparative Example 3 | 45 (Carbon black primary particle) | 58 | 68 | 0.1 | 0.96 |

EXAMPLE 3

Preparation of Electrode Slurry

Li[Ni$_{0.6}$Mn$_{0.2}$Co$_{0.2}$]O$_2$ (i.e., a positive electrode active material), polyvinylidene fluoride (PVdF) (i.e., a binder), and the conductive material of Example 1 were mixed in N-methylpyrrolidone (NMP) (i.e., a solvent) at a weight ratio of 96.5:1.5:2.0 to prepare an electrode slurry.

EXAMPLE 4 AND COMPARATIVE EXAMPLES 5 to 8

Preparation of Electrode Slurry

Electrode slurries of Example 4 and Comparative Examples 4 to 6 were prepared in the same manner as in Example 3, except that, for the conductive material, each of the conductive materials of Example 2 and Comparative Examples 1 to 3 was used instead of the conductive material of Example 1, respectively.

Experimental Example 1

Evaluation of Powder Resistance

Electrode slurries of Examples 3 and 4 and Comparative Examples 4 to 6 were dried under vacuum at a temperature of 130° C. for 3 hours and pulverized to prepare powder. Then, the powder was prepared into a pellet under the conditions (25° C., in an atmosphere of relative humidity of 50% with a load of 9.8 MPa) using the Loresta GP equipment by the Mitsubishi Chem Analytech Co. Then, the powder resistance was measured by the 4-probe method, and the results are shown in Table 2.

TABLE 2

| | Example 3 | Example 4 | Comparative Example 4 | Comparative Example 5 | Comparative Example 6 |
|---|---|---|---|---|---|
| Powder Resistance (Ω) | 127 | 97 | 148 | 154 | 189 |

According to Table 2 above, the powder resistances of Example 3 and Example 4, in which the conductive material according to the present invention was used, was significantly lower than those of Comparative Examples 4 to 6, in which carbon black in the form of a secondary particle was used. That is, it was confirmed that since the conductive materials according to the present invention had a secondary particle shape in which graphene sheets were interconnected, the surface contact between active materials and conductive materials was increased thereby being capable of significantly improving the electrical conductivity of the slurry and electrodes. Additionally, from the result that the powder resistance of Example 4 is significantly lower than that of Example 3, it was confirmed that the control of the graphene sheet size to an appropriate level by further heat treatment can have a significant effect on the improvement of electrical conductivity.

EXAMPLE 5

Preparation of Secondary Battery (1) Preparation of Positive Electrode

The electrode slurry of Example 3 was applied to a positive electrode current collector (Al) having a thickness of 20 pm and dried at 130° C. to prepare a positive electrode.

(2) Preparation of Secondary Battery

Graphite (i.e., a negative electrode active material), carbon black (i.e., a negative electrode conductive material), styrene-butadiene rubber (SBR) (i.e., a negative electrode binder), and carboxymethyl cellulose (CMC) were mixed in distilled water at a weight ratio of 96.5:2:1:0.5 to prepare a negative electrode slurry. The prepared slurry was applied to a negative electrode current collector (Cu) with a thickness of 10 μm and dried at 100° C. to prepare a negative electrode.

Then, a monocell was prepared by combining a polyethylene-based separator having a thickness of 15 pm to be interposed between the prepared negative electrode and positive electrode, and the electrolytic solution (ethylene carbonate (EC)/ethyl methyl carbonate (EMC)=½ (volume ratio), lithium hexafluorophosphate (LiPF$_6$, 1 mol)) was injected to the monocell to prepare a lithium secondary battery.

EXAMPLE 6 AND COMPARATIVE EXAMPLES 7 to 9

Preparation of Secondary Battery

Secondary batteries of Example 6 and Comparative Examples 7 to 9 were prepared in the same manner as in Example 5, except that, for the electrode slurry in the preparation of a positive electrode, each of the slurries of Example 4 and Comparative Examples 4 to 6 was used instead of the slurry of Example 3, respectively.

Experimental Example 2

Evaluation of Discharge Capacity According to Discharge C Rate

The lithium secondary batteries prepared in Examples and 6 and Comparative Examples 7 to 9 were evaluated according to discharge C-Rate and the results are shown in Table 3 below. Specifically, the charge C-Rate was fixed at 0.2 C, and the 2.0 C discharge capacity relative to 0.2 C discharge capacity (%) was evaluated while increasing the discharge C-Rate from 0.2 C to 2.0 C.

TABLE 3

| | Example 5 | Example 6 | Comparative Example 7 | Comparative Example 8 | Comparative Example 9 |
|---|---|---|---|---|---|
| 2.0 C Discharge Capacity Relative to 0.2 C Discharge Capacity (%) | 83.9 | 86.1 | 79.8 | 75.2 | 71.7 |

According to Table 3, the battery capacities of Example 5 and Example 6, where the conductive material according to the present invention was used, showed higher values compared to those of Comparative Examples 7 to 9, where the carbon black in the form of a secondary particle was used. That is, it was confirmed that the electrical conductivity of electrodes can be significantly improved by the application of the novel conductive material of the present invention in the form of a secondary particle where graphene sheets are interconnected.

The invention claimed is:

1. A conductive material comprising:
 a structure where a plurality of graphene sheets are interconnected; and
 a connecting part connected to at least a part of the plurality of graphene sheets,
 wherein the connecting part is a carbon compound having a non-graphene form,
 wherein an oxygen content is 1 wt % or higher based on a total weight of the conductive material; and
 a D/G peak ratio is 2.0 or less as measured by the Raman spectrum,
 wherein a longest length of the graphene sheet is 200 nm or less.

2. The conductive material of claim 1, wherein a value calculated by the following Equation 1 is equal to 0.2 or less:

$$\frac{|b-a|}{a} \quad \text{[Equation 1]}$$

wherein, in the Equation 1 above, a is a specific surface area (m$^2$/g) measured by the nitrogen adsorption BET method and b is an iodine adsorption value (mg/g) of the conductive material.

3. The conductive material of claim 1, wherein at least a part of each of the plurality of graphene sheets is connected to the connecting part.

4. The conductive material of claim 1, wherein an average thickness of the graphene sheet is 10 nm or less.

5. The conductive material of claim 1, wherein a specific surface area (m$^2$/g) of the conductive material measured by the nitrogen adsorption BET method is 200 m$^2$/g or higher.

6. An electrode comprising at least one conductive material of claim 1.

7. A secondary battery, comprising:
 a positive electrode;
 a negative electrode;
 a separator interposed between the positive electrode and the negative electrode; and
 an electrolyte, wherein at least one of the positive electrode and the negative electrode is an electrode of claim 6.

8. A method for preparing the conductive material of claim 1, the method comprising:
 preparing a preliminary conductive material; and
 transforming the preliminary conductive material by oxidation treatment, wherein the transforming the preliminary conductive material by oxidation treatment comprises at least one of the followings:
 a) subjecting the preliminary conductive material to a first heat treatment in an oxygen atmosphere or air atmosphere at a temperature of 200° C. to 800° C.; or
 b) reacting the preliminary conductive material with acidic vapor at 120° C. to 300° C.

9. (withdrawn — currently amended) The method of claim 8, wherein preparing the preliminary conductive material comprises pyrolyzing acetylene gas at a temperature of 1,500° C. or higher.

10. The method of claim 8, wherein the preliminary conductive material is at least any one selected from the group consisting of acetylene black, furnace black, thermal black, channel black, and lamp black.

11. The method of claim 10, wherein the preliminary conductive material is acetylene black.

12. The method of claim 8, further comprising, after the transforming the preliminary conductive material by oxidation treatment, subjecting the preliminary conductive material transformed by oxidation treatment to a second heat treatment at a temperature of 500° C. or higher in an inert atmosphere.

* * * * *